March 23, 1926.
O. G. MESSENGER
1,577,481
PROCESS OF MAKING CARBON BLACK
Filed Oct. 18, 1923
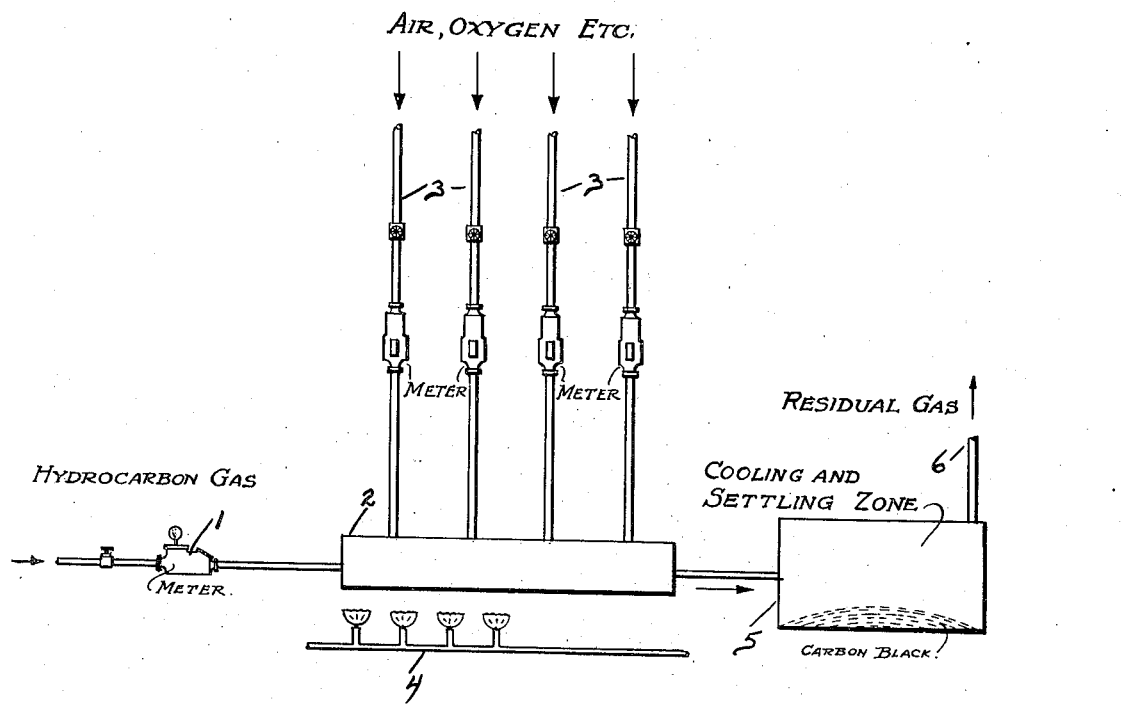
O. G. Messenger Inventor
By Attorney Patented Mar. 23, 1926.

1,577,481

UNITED STATES PATENT OFFICE.

OTIS G. MESSENGER, OF CRANFORD, NEW JERSEY, ASSIGNOR TO STANDARD DEVELOPMENT COMPANY, A CORPORATION OF DELAWARE.

PROCESS OF MAKING CARBON BLACK.

Application filed October 18, 1923. Serial No. 669,317.

*To all whom it may concern:*

Be it known that I, OTIS G. MESSENGER, a citizen of the United States, residing at Cranford, in the county of Union and State of New Jersey, have invented new and useful Improvements in Processes of Making Carbon Black, of which the following is a specification.

This invention relates to the art of making carbon black, and will be fully understood from the following description, taken in connection with the accompanying drawing, in which the single figure is a diagrammatic view of an apparatus suitable for practicing the invention.

While carbon pigments are made from various materials and by a number of different procedures, the general type of product known as gas black is particularly favored by certain consuming industries. This product shows in general a superior depth of black "coloration", being free from brownish or grayish tinge, and free from tarry matter or grit or coky particles, and having withal superior covering power and fineness of ultimate particles. In its customary method of manufacture, natural gas is burned in burners arranged to project their flame against a cooling surface in order to cool down a part of the incandescent particles in the flame and rescue as much of the carbon from consumption as possible. While giving an excellent product, as indicated, this method results in yields which are but a small fraction of the potential carbon content of the gas. With a view to securing higher yields, it has been proposed instead of this to subject the gas to externally supplied heat, such as by passing the gas over hot refractory surfaces or through hot retorts, the heat causing a thermal decomposition of the hydrocarbon and resulting in free carbon and hydrogen. Such decomposition or cracking, however, inherently processeds on the lines of producing not only simple split products, carbon and hydrogen, but also more complex products as well, and tarry matter is accordingly an inevitable contamination more or less adsorbed on the carbon particles produced; moreover from contact with the heating surfaces the carbon produced is in a more dense form and is more or less cokified, and quality clear blacks are not realized. Again, in processes supplying from an external source all of the heat required, the cost factor becomes a serious matter as compared against the above mentioned simple combustion process.

In accordance with the present invention, instead of abruptly burning the hydrocarbons and rescuing from the flame such carbon as can be saved, I progressively react upon the hydrocarbons under regulated conditions and eliminate the hydrogen so as to leave the carbon free. While I prefer for raw material those hydrocarbons containing not over four carbon atoms to the molecule, as such material is cheaply available, the invention is not at all limited thereto, but is applicable with hydrocarbons generally that can be brought to a vaporous or gaseous (or as it may be generically termed "gasiform") condition in the reaction zone. The hydrocarbons are initially raised to reaction temperature to start off with, and oxygen or air is supplied in a successive series of small portions or fractional doses, each adapted to occasion reaction with some of the hydrogen atoms of the molecules, and insufficient in available oxygen or in reaction temperature resultant to materially attack the carbon atoms. By thus dividing and spacing the fractional feeds of oxygen the temperature can be closely controlled on down toward the end to limits to especially attack the hydrogen, rather than attack hydrogen and carbon indiscriminately. Where the composition of the gas is known, the total oxygen or air theoretically necessary to react with the hydrogen atoms of a given volume of the hydrocarbon can be readily calculated and this can then be divided up or apportioned between the successive fractional portions or doses introduced.

Referring to the drawing, in practical working the hydrocarbon gas can be flowed through a meter 1 and along through an extended conduit or reaction passageway 2 and the oxygen or air can be conveniently introduced from a series of meter-equipped inlet pipes 3 located along at spaced intervals. The beginning of the reaction conduit preferably will be equipped with a suitable heating means 4, although if desired it is within the scope of the invention to heat the air instead.

After the reaction is started the temperature necessary can ordinarily be adequately held and controlled by the rate of introduction of the oxygen, but it is within the scope of the invention to provide additional heat at whatever point desired. In metering the feeds it is generally desirable to slightly increase the total air over the exact total theoretical requirement. Instead of having all the fractional feeds exactly equal, the later feeds of air can be made larger than the earlier; and even if the final feed be crowded to the point of making inroads upon the carbon the loss will be self-limited.

The temperature proper at the start off will vary with the hydrocarbons treated. For the range of hydrocarbon gases ordinarily available starting temperatures of 600°–1000° F. are in general suitable, broadly speaking the fewer the carbon atoms to the molecule, the higher the temperature required. In the case for example of a well-stripped natural gas containing no hydrocarbon of substantially more than three carbon atoms, or a vent gas in an absorber system, such a gas as contains for instance substantially only propane and ethane, I prefer an initial temperature of about 775°–850° F.

From the last reaction point the final products pass to a cooling and settling zone 5 and then residual gases, essentially nitrogen and steam, are conducted away through the line 6.

There are other reagents, as chlorin, sulfur, etc. which can be used instead of oxygen for the successive series of reactions gaged to preferentially attack and remove the hydrogen from the hydrocarbon molecules so as to leave carbon, and while it may be stated that at present it is particularly air (or in special cases oxygen) that is commercially attractive, it is to be understood that such other reagents come within the broader purview of the invention.

While I have described my invention by reference to certain specific details, it will be understood that all changes are contemplated which come within the spirit and scope of the invention.

I claim:

1. The process of making carbon black, which comprises heating a hydrocarbon gas containing molecules of not over three carbon atoms to a temperature of about 775°–850° F., and reacting upon the gas with a successive series of small regulable portions of air to progressively attack the hydrogen of the molecules and leave free carbon.

2. The process of making carbon black, which comprises heating a hydrocarbon gas and reacting upon the gas with a successive series of small regulable portions of air to progressively preferentially attack the hydrogen.

3. The process of making carbon black, which comprises reacting upon a hydrocarbon in gasiform condition with a successive series of small regulable portions of oxygen and recovering the residue of carbon black so formed.

4. The process of making carbon black, which comprises supplying a hydrocarbon in gasiform condition to a reaction zone, adding successive small portions of an oxydizing agent to said zone, regulating the amount of said oxydizing agent to preferentially attack and remove the hydrogen from the hydrocarbon molecules, and recovering the residues of free carbon formed.

OTIS G. MESSENGER.